Sept. 7, 1926.  W. FRANKENBERGER  1,598,767

PLUMBING FIXTURE

Filed March 13, 1924

WITNESSES

J. Hatch Bradley.

INVENTOR

William Frankenberger
By Greenland McCallester
His Attorneys

Patented Sept. 7, 1926.

1,598,767

UNITED STATES PATENT OFFICE.

WILLIAM FRANKENBERGER, OF LOUISVILLE, KENTUCKY, ASSIGNOR TO STANDARD SANITARY MANUFACTURING COMPANY, A CORPORATION OF NEW JERSEY.

PLUMBING FIXTURE.

Application filed March 13, 1924. Serial No. 698,939.

This invention relates to plumbing fixtures and more particularly to handles and valve stems for fixtures such as bibbs, cocks, faucets and valves.

An object of this invention is to provide a fixture of the type set forth which has a rugged construction and at the same time an attractive and pleasing appearance.

A further object is to provide a plumbing fixture having an improved form of joint between the handle and the valve stem.

Figure 1:
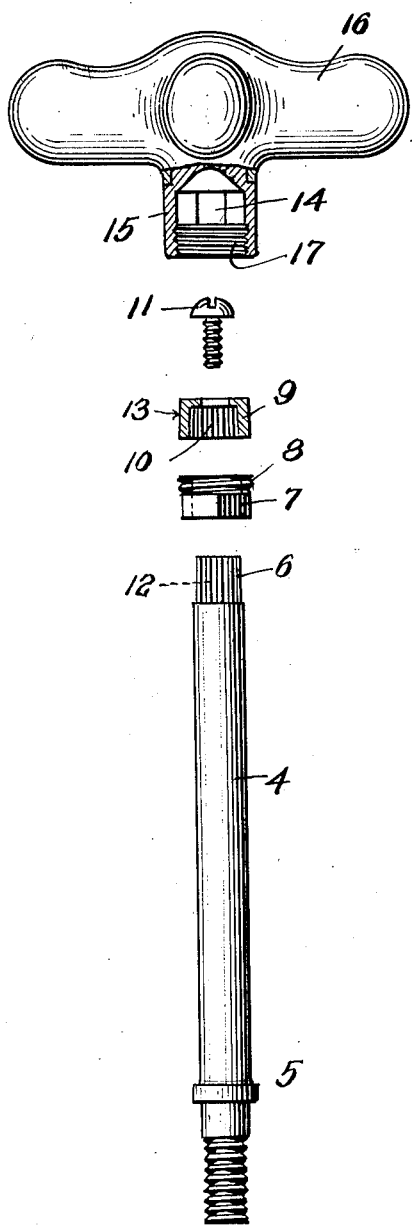
Figure 2:
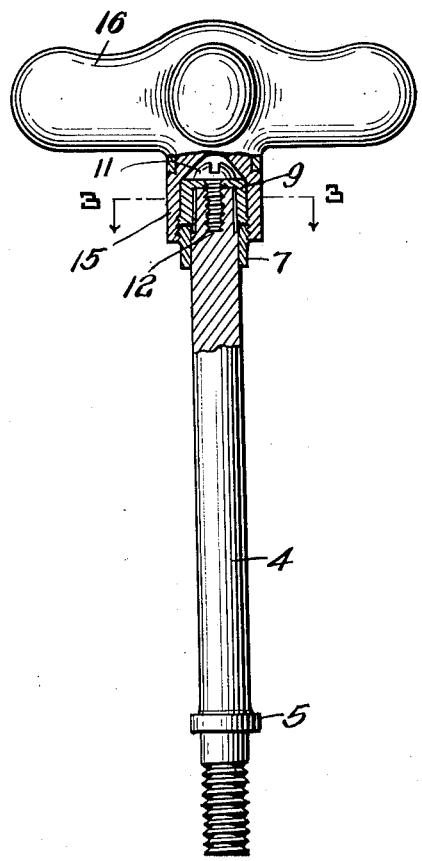
Figure 3:
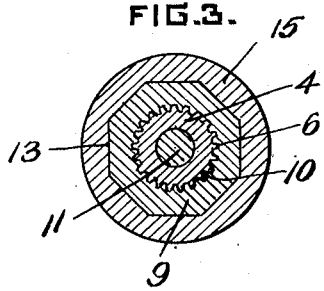

These and other objects which will appear obvious to those skilled in the art, are attained by means of this invention, one embodiment of which is shown, for the purposes of illustration, in the accompanying drawings, in which, Figure 1 is a disassembled view in elevation showing the separate parts of the invention, Fig. 2 is a side elevation partly in section showing the parts assembled together and Fig. 3 is a cross section on the line 3—3 of Fig. 2.

The invention includes a valve stem 4 of conventional form having the usual shoulder 5 at the valve end. A series of longitudinally extending ribs or teeth 6 is provided at the other end which may be knurled thereon or formed in any desired manner. A sleeve 7 having external threads 8 at one end thereof and a smooth cylindrical bore is slidably received on the valve stem.

A socket fitting head 9 having internal longitudinally extending teeth or ribs 10 fits over the toothed end of the valve stem 6 on which it is held by means of a screw 11 which is threaded into an opening 12 formed in the end of the valve stem. The socket fitting head is of greater outside diameter than the valve stem and for this reason must be made separate therefrom so that the sleeve 7 may be placed on the valve stem prior to securing the head thereon as the shoulder 5 keeps the sleeve from being positioned on the stem from the lower end. The outer surface of the sleeve adjacent the threads 8 is buffed and polished prior to being placed on the valve stem. The teeth 10 of the socket fitting head engage the teeth 6 of the valve stem so that the head is non-rotatably secured to the valve stem.

The outer surface 13 of the socket fitting head is polygonal and snugly fits a polygonal socket 14 formed in a projection 15 of the fixture handle 16. In order to obtain a tight fit the engaging polygonal surfaces 13 and 14 are slightly tapered. The outer end of the socket forming projection 15 has internal screw threads 17 for engaging the threads 8 of the sleeve 7 so as to hold the parts together.

The fixture is then composed of two separate units; one, the handle with its socketed extension and the other, the valve stem with the enlarged head and the sleeve by means of which the two units are secured together.

To assemble the parts the sleeve 7 is slipped over the valve stem and the socket fitting head 9 is secured to the end thereof by means of the screw 11. The engaging teeth 6 and 10 prevent any relative rotation between the valve stem and the head. The end of the valve stem is then placed within the extension 15 so that the polygonal surface 13 of the socket fitting head engages the similar surface 14 within the socket.

The sleeve 7 is then threaded into the socket so as to clamp the parts together as shown in Fig. 2. The socket fitting head, being of greater outside diameter than the valve stem, forms a shoulder with which the sleeve cooperates to clamp the two units together. The engaging polygonal surfaces prevent any relative rotation between the socket engaging head and the handle and the teeth 6 and 10 prevent relative rotation between the head and valve stem.

Various modifications will appear obvious to those skilled in the art and although I have described a specific form of this invention I do not wish to be limited thereto but what I claim as new and desire to secure by Letters Patent is:

1. The combination with a valve stem of a detachable socket fitting head secured thereto, a handle provided with a socket adapted to fit said head and means connected to said handle and engaging said head for operatively securing said head and handle together.

2. The combination with a valve stem of a detachable socket fitting head non-rotatably secured thereto so as to form an annular shoulder thereon, a handle provided with a head receiving socket and a sleeve on said stem threaded to said socket and cooperating with said shoulder for operatively securing said handle to said stem.

3. The combination with a valve stem, of a detachable, socket fitting head non-rotatably secured to said stem, a handle provided with a socket adapted to fit said head and a sleeve engaging said head and threaded to said socket for operatively securing said head and handle together.

4. The combination with a valve stem having a toothed end, of a cup shaped head secured thereto so as to form an annular shoulder and provided with internal teeth cooperating with the teeth on said stem to prevent relative rotation between said stem and head, a handle provided with a socket adapted to non-rotatively receive said head and means cooperating with said shoulder for securing said stem and handle together.

5. The combination with a valve stem, of a socket fitting head detachably and immovably secured thereto so as to form an annular shoulder, a handle provided with a socket adapted to non-rotatably receive said head and a sleeve engaging said shoulder and threaded to said socket so as to secure said stem and handle together.

6. The combination with a valve stem having a serrated end of a head secured thereto so as to form an annular shoulder and provided with internal serrations cooperating with the serrations on said stem to prevent relative rotation between said stem and head, a handle provided with a socket adapted to non-rotatably receive said head and a sleeve on said stem adapted to be secured to said socket and cooperating with said shoulder for securing said stem and handle together.

In testimony whereof, I have hereunto subscribed my name this 3rd day of March, 1924.

WILLIAM FRANKENBERGER.